United States Patent
Johanning et al.

(10) Patent No.: US 11,459,235 B2
(45) Date of Patent: Oct. 4, 2022

(54) METHOD FOR TREATING A SYNTHESIS GAS STREAM

(71) Applicants: thyssenkrupp Industrial Solutions AG, Essen (DE); thyssenkrupp AG, Essen (DE)

(72) Inventors: Joachim Johanning, Oberhausen (DE); Bernd Keil, Dortmund (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 531 days.

(21) Appl. No.: 16/482,012

(22) PCT Filed: Jan. 10, 2018

(86) PCT No.: PCT/EP2018/050573
§ 371 (c)(1),
(2) Date: Jul. 30, 2019

(87) PCT Pub. No.: WO2018/141519
PCT Pub. Date: Aug. 9, 2018

(65) Prior Publication Data
US 2019/0389724 A1    Dec. 26, 2019

(30) Foreign Application Priority Data
Feb. 2, 2017  (DE) ................ 10 2017 201 681.7

(51) Int. Cl.
*C01B 3/48*    (2006.01)
(52) U.S. Cl.
CPC ........ *C01B 3/48* (2013.01); *C01B 2203/0233* (2013.01); *C01B 2203/0288* (2013.01);
(Continued)

(58) Field of Classification Search
CPC .............. C01B 3/48; C01B 2203/0233; C01B 2203/0288; C01B 2203/068;
(Continued)

(56) References Cited

U.S. PATENT DOCUMENTS

| 4,296,085 A | 10/1981 | Banquy |
| 4,545,976 A | 10/1985 | Osman |

(Continued)

FOREIGN PATENT DOCUMENTS

| EP | 0011404 B | 5/1980 |
| EP | 0113198 A | 7/1984 |
| EP | 0816290 A | 1/1998 |

OTHER PUBLICATIONS

English Translation of International Search Report issued in PCT/EP2018/050573, dated Mar. 27, 2018.

*Primary Examiner* — Douglas B Call
(74) *Attorney, Agent, or Firm* — thyssenkrupp North America, LLC

(57) ABSTRACT

A process can be used to treat a synthesis gas stream comprising steam reforming firstly in a primary reformer and subsequently in a secondary reformer. Crude synthesis gas exiting the secondary reformer may be cooled in a steam generator and then further cooled in a steam superheater. The crude synthesis gas stream after exiting the secondary reformer may be split into at least two gas substreams, of which only a first gas substream is fed to the steam generator. A second gas substream may be supplied to the steam superheater, bypassing the steam generator. Only the first gas substream, after flowing through the steam generator, may be subjected to a CO conversion reaction in a first CO conversion reactor before the first gas substream is supplied to the steam superheater.

13 Claims, 1 Drawing Sheet

(52) U.S. Cl.
CPC ............... *C01B 2203/068* (2013.01); *C01B 2203/0894* (2013.01); *C01B 2203/1294* (2013.01); *C01B 2203/142* (2013.01)

(58) Field of Classification Search
CPC .... C01B 2203/0894; C01B 2203/1294; C01B 2203/142
USPC ..................................................... 423/650
See application file for complete search history.

(56) References Cited

U.S. PATENT DOCUMENTS

| | | | |
|---|---|---|---|
| 6,048,508 A | 4/2000 | Dummersdorf | |
| 8,377,154 B2 * | 2/2013 | Ariyapadi | ............... C01B 3/52 48/61 |
| 2010/0179232 A1 | 7/2010 | Robinson | |
| 2015/0321913 A1 | 11/2015 | Knudsen | |

\* cited by examiner

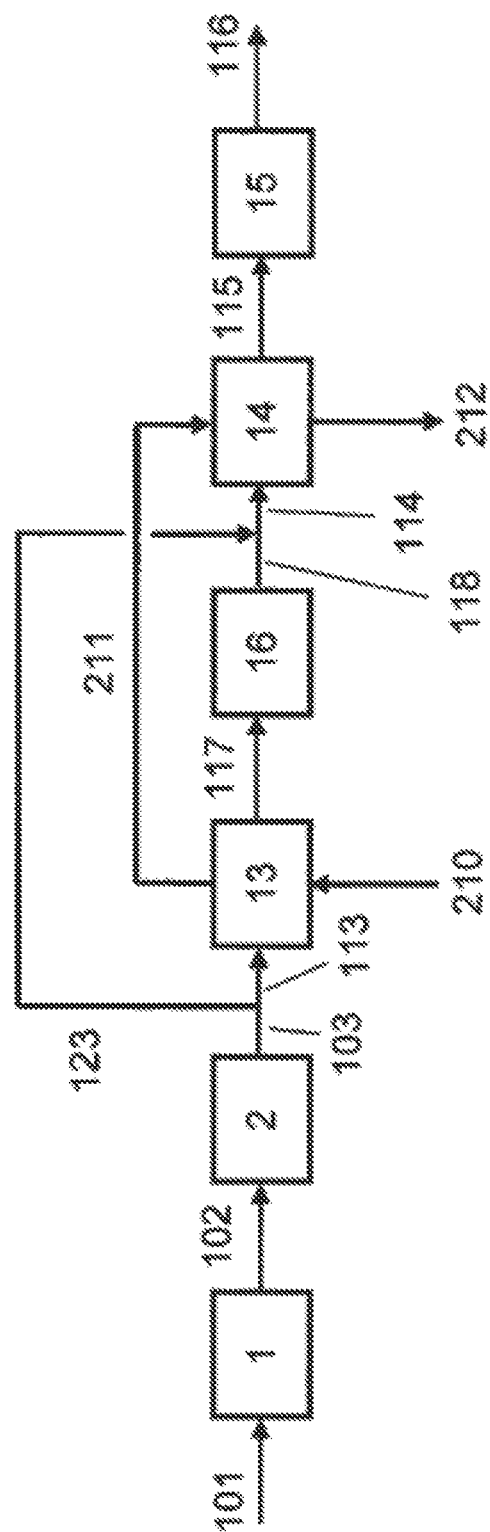

METHOD FOR TREATING A SYNTHESIS GAS STREAM

CROSS REFERENCE TO RELATED APPLICATIONS

This application is a U.S. National Stage Entry of International Patent Application Serial Number PCT/EP2018/050573, filed Jan. 10, 2018, which claims priority to German Patent Application No. DE 10 2017 201 681.7, filed Feb. 2, 2017, the entire contents of both of which are incorporated herein by reference.

FIELD

The present disclosure generally relates to processes for treating synthesis gas streams.

BACKGROUND

Synthesis gas refers to a gas mixture of carbon monoxide and water which, inter alia, is used for producing ammonia. Synthesis gas can be produced, for example, by steam reforming of natural gas. In steam reforming, methane reacts with steam in the primary reformer according to the following equation (1):

$$CH_4 + H_2O \rightarrow CO + H_2 \quad (1)$$

In the primary reformer, the methane gas is only incompletely converted. In order to increase the yield of hydrogen and to keep the residual content of methane as low as possible, the residual methane gas is reacted with oxygen to give carbon monoxide and hydrogen in a second step in the secondary reformer. For this purpose, the secondary reformer is charged with air, wherein the nitrogen required for the later ammonia synthesis is also introduced into the gas mixture.

$$2CH_4 + O_2 \rightarrow 2CO + 4H_2 \quad (2)$$

Subsequently, the so-called CO shift conversion, also referred to as the water-gas shift reaction, is carried out which is employed to reduce the carbon monoxide fraction in the synthesis gas and to generate additional hydrogen. It is an equilibrium reaction which is exothermic and which follows the equation reproduced below:

$$CO + H_2O \rightleftharpoons CO_2 + H_2 \quad (3)$$

In the production of synthesis gas in ammonia and hydrogen plants, the process gas after reforming is typically present at very high temperatures. Optimal utilization of the very high-value waste heat, however, is countered in particular by the mechanism of metal dusting attack on all metal surfaces. The reason for this is the high carbon monoxide partial pressure in these gases, triggered by the relatively high carbon monoxide contents related to the process in combination with the high total pressures in the plants built nowadays.

Due to the process-related cooling of the synthesis gas required after reforming, an increasing thermodynamic disequilibrium develops in the gas since the conversion of carbon monoxide to carbon dioxide corresponding to the shifting equilibrium position as a result of the rapid drop in temperature cannot take place. Due to this disequilibrium, the process gas develops an increasing carbon activity since the carbon monoxide can be partially reduced to pure carbon via several reaction mechanisms.

The carbon deposits partly on the surfaces of the flow-guiding components. The carbon deposited on the metallic surfaces in a temperature window of approximately 450-750° C. initiates the destructive mechanism known as "metal dusting" (MD). The carbon diffuses into the surfaces and forms carbides here with the base material. From a certain degree of saturation, some of the carbides formed decompose again with destruction of the microstructure of the material. The resulting dust is removed by the flow and the damaged microstructure sustains a steady substance loss to the point of complete destruction.

The temperature window in which the MD attack is critical is determined by two opposing mechanisms. The thermodynamic disequilibrium in the gas grows continuously with decreasing temperature and thus the driving force for the carbon precipitation. At the same time however, the conversion rates of the reactions involved decrease with decreasing temperature and also all diffusion and deposition processes such that the MD attack on an industrial scale comes to a halt.

Highly alloyed austenitic steels and nickel-based materials currently allow the highest working temperatures, however no fully MD resistant material is known to date. Therefore, the process waste heat can only currently be used up to a comparatively low temperature level, i.e. thermodynamically less efficiently. Conventionally, therefore, in ammonia and hydrogen plants, substantial utilization of the heat is for pure steam generation and only a low proportion for steam superheating, due to the limited superheating temperature with respect to the risk of MD. For further steam superheating, therefore, other waste heat present in the process must be used, generally waste heat from the flue gas of the steam reformer.

This heat can thus no longer be used for other purposes, particularly for the intensive preheating of the process media and decreasing the furnace requirement for the primary reformer. Instead, the process generates a correspondingly larger amount of steam. In a fertilizer plant in which the ammonia plant provides the reactants for a downstream urea plant, the excess steam can be utilized internally without disadvantages for the specific energy requirements of the total plant. For a standalone ammonia plant or a hydrogen plant, however, a lowest possible steam export is generally advantageous since a purchaser of the excess steam is usually not readily available. A highest possible steam superheating temperature for the steam in the process gas path for reducing the total amount of steam generated is therefore particularly advantageous for these plants.

The specific energy consumption of ammonia and hydrogen plants is increasingly an essential assessment criterion for the purchaser of such plants and thus an increasingly important element for the competitiveness of the plants. The dominant influence on the specific energy consumption of the plants is the most efficient utilization of the waste heat produced within the process. This causes a transfer of heat from the process gas to working media, for example steam at the highest possible temperature level, in order to achieve the greatest yield of mechanical work in downstream operating processes and accordingly to generate less waste heat.

In the field of reforming, heat transfer at a high temperature level is opposed to the destructive mechanism of metal dusting which is triggered by the large partial pressure of the carbon monoxide present in the synthesis gas. In recent years, improved materials have been developed by material suppliers which have moderately shifted the temperature operating limits to higher temperatures. However, fully resistant materials are not yet known. In addition to this, the improved materials—due to the ever higher proportions of high-quality alloy elements—are more expensive and processing thereof is costlier.

The carbon activity as a decisive parameter for the metal dusting potential of a process gas having a significant proportion of carbon monoxide is determined by several parameters. The carbon monoxide content and the total pressure have the greatest influence, which together determine the partial pressure of the carbon monoxide, and also the temperature. The carbon activity is directly proportional to the CO partial pressure and thus the carbon monoxide content. There is a reciprocal dependence with regard to the temperature, i.e. the carbon activity increases with decreasing temperature. Reduction of the CO content in the process gas and operation of the steam superheater at higher temperature are therefore in principle advantageous for reducing the metal dusting potential.

In principle, reduction of the CO content could also be achieved by an additional conversion between the steam generator and the steam superheater since the equilibrium position of the water-gas shift reaction according to reaction equation (3) reproduced above has already been shifted significantly to the carbon dioxide side by the reduced temperature. It can be concluded from the operational experiences with the catalysts available to date for the CO conversion that a mechanically and thermally correspondingly more durable catalyst having the required selectivity will not be available for the foreseeable future.

EP 0 816 290 B1 describes a process for treating a synthesis gas stream comprising steam reforming in a primary reformer and subsequently in a secondary reformer, wherein a CO conversion stage is further provided downstream of the secondary reformer. The main aim of the process is to enable a maximum possible economic production of pure CO gas—starting from hydrocarbon-containing feedstocks, especially natural gas, and to generate the maximum possible amount of the second co-product stream predominantly comprising hydrogen.

In this known process, it is proposed to divert a gas substream from the synthesis gas stream between the secondary reformer and the following CO conversion stage, to cool this gas substream to a temperature below 100° C., to condense out the steam present in the gas stream, then to separate the remaining crude synthesis gas in a multi-stage gas separation plant into the gas components $H_2$, residual $H_2O$, $CH_4$, $CO_2$ and $N_2$ and to separate them off individually or together from CO, to compress these gas components separated from the CO to a higher pressure which is above the pressure in the CO conversion stage, to combine them again to give a mixed gas stream and to feed this mixed gas stream again after heating to a temperature of 200° C. to 500° C. to the CO conversion stage of the steam reformer, wherein the remaining pure CO fraction is removed separately and is optionally supplied for further processing.

In the process known from EP 0 816 290 B1, the total product stream exiting the secondary reformer is firstly fed in a conventional manner to a heat exchanger in which steam is generated. In this apparatus the metallic components operate—due to the intensive heat transfer on the water side in the region of the evaporation and the relatively low evaporation temperature, at a temperature level below the critical temperature interval concerning metal dusting. Only downstream in the direction of flow of this steam generator is there a splitting into two gas substreams, one of which is cooled in a countercurrent heat exchanger and is then fed to a multi-stage CO separation plant. The mixed gas stream obtained from the first gas substream, which is heated again, is combined again with the main synthesis gas stream in this known process, before it is fed together with this to the CO conversion stage. The characteristic lack of utilization of the heat present in the process gas after the secondary reformer for steam superheating in the conventional process regime is not altered by the process according to EP 0 816 290 B1.

A process for treating a synthesis gas stream with the features mentioned at the outset is known from the U.S. Pat. No. 4,545,976 A, in which a bypass line is provided such that a gas substream of the synthesis gas bypasses the steam generator and is then recombined with the other gas substream which is passed through the steam generator and together with this is fed to a steam superheater. In this known process, CO conversion of the combined synthesis gas stream is provided downstream of the steam superheater in order to catalytically convert carbon monoxide to carbon dioxide and further hydrogen. A disadvantage in this known process is that the higher the inlet temperature in the steam superheater, the greater the proportion of gas which is passed via the bypass line. This is unfavorable for the service life of the steam superheater. Only at temperatures below 450° C. does metal dusting no longer occur, since the diffusion rate of carbon into the steel microstructure of the apparatus is then negligibly small. Since the inlet temperature in the steam superheater is above 450° C. here, this is in the operating temperature range of metal dusting. The bypass therefore cannot serve to protect the steam superheater from metal dusting but only serves to adjust the inlet temperature in the first high-temperature shift converter.

Thus a need exists for improving processes for treating synthesis gas streams with respect to the possibilities of internal heat utilization.

BRIEF DESCRIPTION OF THE FIGURE

FIG. 1 is a schematic flow diagram of an example plant for treating a synthesis gas stream.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to processes for treating synthesis gas streams that comprise steam reforming firstly in a primary reformer and subsequently in a secondary reformer. Crude synthesis gas exiting the secondary reformer may be cooled in a steam generator and then further cooled in a steam superheater. After exiting the secondary reformer, the crude synthesis gas stream may be split into at least two gas substreams, of which only a first gas substream is fed to the steam generator. A second gas substream may be supplied to the steam superheater bypassing the steam generator. Some example processes may further comprise a CO conversion of the synthesis gas stream in a CO conversion reactor.

It is provided according to the invention that only the first gas substream, after flowing through the steam generator, is subjected to a CO conversion reaction in a first CO conversion reactor, before this first gas substream is supplied to the steam superheater.

The core of the inventive idea is therefore the partial early CO conversion shift for a substream of the synthesis gas.

In the context of the present invention, it is advantageous to make the substream which bypasses the steam generator as large as possible to enable the highest possible inlet temperature of the hot cracking gas in the steam superheater and to be able to comprehensively superheat the steam. The resulting increased metal dusting that would otherwise be caused is avoided, however, by subjecting the other substream, which passes through the steam generator, to a partial conversion after passing through the steam generator, and thus reducing the partial pressure of the harmful CO.

Preferably, in accordance with a development of the process, the first gas substream, after passing through the steam generator, is subjected to a CO conversion reaction according to the reaction equation (3) reproduced above in a conversion reactor.

Furthermore, the first gas substream after exiting from the conversion reactor is preferably recombined with the second gas substream.

Preferably, a partially converted crude synthesis gas stream formed from the first gas substream and the second gas substream combined with this is then supplied to the steam superheater.

The first substream in this preferred configuration of the process is therefore used in a conventional manner for steam generation and is cooled to a temperature which enables conversion of a large fraction of the carbon monoxide to carbon dioxide. Subsequently, the converted first substream is recombined with the second substream. The resultant total stream therefore has by definition a significantly lower carbon monoxide content than the corresponding process gas stream of a plant with conventional heat utilization and correspondingly lower carbon activity. It is then supplied to the steam superheater, as in a plant with a conventional process regime, but has a significantly reduced metal dusting potential.

Preferably, according to a development of the invention, a cooled crude synthesis gas stream exiting from the steam superheater is subsequently fed to a further CO conversion reactor such that a fully converted crude synthesis gas is thereby obtained.

The saturated steam generated in the steam generator is preferably then fed to the steam superheater. Since only a portion of the amount of synthesis gas is used for steam generation, the amount of steam in the process according to the invention is specifically significantly smaller than in the conventional process regime.

The superheated steam from the steam superheater—on account of the reduced amount compared to the conventional process regime—can generally be used internally in the plant and does not need to be exported.

In the preferred variant of the process according to the invention described above, a fully converted crude synthesis gas stream is discharged from the further CO conversion reactor.

As a result of experiments in connection with the present invention, it has proved advantageous if the total gas stream is split into two gas substreams $m_1$ and $m_2$, and the first substream $m_1$ to the total stream $m_1+m_2$ is in a ratio $m_1$:$(m1+m2)$ of 0.9 or less, preferably 0.8 or less, particularly preferably 0.7 or less.

Furthermore, it is advantageous if the splitting ratio of the two substreams is selected such that the mixing temperature of the recombined substreams is at least approximately 440° C., preferably at least approximately 490° C., particularly preferably at least approximately 550° C. The dependence of the parameters carbon activity and mixing gas temperature on the selection of the respective splitting ratio of the two substreams is clear from the values reproduced in Table 1 below and in this context is elucidated in more detail below.

The present invention further relates to a plant, especially for carrying out the aforementioned process, wherein this plant comprises:

at least one primary reformer, at least one secondary reformer downstream of said primary reformer in the direction of flow, at least one steam generator downstream of the secondary reformer in the direction of flow and at least one steam superheater downstream of the steam generator in the direction of flow, wherein at least one branch line branching off downstream of the secondary reformer in the direction of flow is provided for a second gas substream of the crude synthesis gas stream, which is diverted into the line in a region downstream of the steam generator and upstream of the steam superheater, bypassing the steam generator, in which a first gas substream of the crude synthesis gas stream is flowing, which has flowed through the steam generator, wherein in accordance with the invention at least one CO conversion reactor is arranged in the direction of flow between the steam generator and the steam superheater through which flows only the first gas substream of the crude synthesis gas stream.

Furthermore, the plant according to the invention comprises at least one further CO conversion reactor which is arranged downstream of the steam superheater, and through which flows a combined crude synthesis gas stream comprising both the first gas substream and the second gas substream.

The splitting ratio of the two substreams is preferably selected such that the mixing temperature permits the possible raising of the steam superheating temperature due to the lower carbon activity. By means of reducing the total amount of steam generated and the higher superheating temperature in the process gas path, a lower amount of heat is required from the flue gas of the reformer than in conventional waste heat utilization. The heat released can therefore be used for intensive preheating of the process media and can reduce the furnace requirements of the reformer. Furthermore, the amount of steam export of the plant is reduced.

Table 1 below shows by way of example the dependence of the carbon activity and the gas temperature of the total stream after mixing as a function of the amount ratio of the two substreams. The table illustrates that at comparable carbon activities as in a plant with a conventional process regime, significantly higher gas temperatures and therefore higher steam superheating temperatures can be implemented. The ratio $m1/(m1+m2)=1.0$ characterizes here the conventional process regime without stream splitting.

TABLE 1

Carbon activity and mixing gas temperature
as a function of the splitting ratio

| Parameter | Unit | | | | |
|---|---|---|---|---|---|
| $m_1/(m_1 + m_2)$ | — | 1.00 | 0.90 | 0.80 | 0.70 |
| C activity | — | 353 | 76 | 20 | 6 |
| Mixing temperature | °C. | 443 | 502 | 560 | 618 |

The C activities shown in Table 1 are distinctly lower than the C activities of the total stream after purifying the substreams 14 and 15 in the process proposed in EP 0 816 290 B1. The process proposed in this document thus comprises no approach to reducing the metal dusting potential of the process gas stream and therefore guides a person skilled in the art away from the solution approach of the present invention.

The gas composition downstream of the secondary reformer specified in Table 2 forms the basis of the values listed by way of example in Table 1.

TABLE 2

Composition of the process gas downstream
of the secondary reformer

| Component | Proportion in mol % |
|---|---|
| $CH_4$ | 0.24 |
| $CO_2$ | 4.58 |
| CO | 9.10 |
| Ar | 0.19 |
| $H_2$ | 37.06 |
| $N_2$ | 15.60 |
| $H_2O$ | 33.23 |

The temperature at the outlet of the secondary reformer is 1012° C. and the pressure is 34 bara. In the steam generator, the main stream $m_1$ is cooled to 370° C. and sustains a pressure drop of 0.3 bar. As a result of the exothermicity of the subsequent CO conversion, the temperature of the main stream $m_1$ increases again to 443° C. The pressure drops as a consequence of the pressure drop in the reactor to 33.2 bara. The composition of the converted main stream $m_1$ is shown in Table 3.

TABLE 3

Composition of the converted main stream $m_1$

| Component | Proportion in mol % |
|---|---|
| $CH_4$ | 0.24 |
| $CO_2$ | 11.20 |
| CO | 2.48 |
| Ar | 0.19 |
| $H_2$ | 43.68 |
| $N_2$ | 15.60 |
| $H_2O$ | 26.61 |

The substream $m_2$ separated downstream of the secondary reformer is fed again, without cooling and modifying the composition, to the main stream $m_1$ after conversion. The compositions arising as a result can be readily determined by a common mixture calculation known to those skilled in the art such that a presentation of this point can be dispensed with.

Table 1 shows that the more the splitting ratio decreases, i.e. the smaller the first gas substream $m_1$, which is fed to the steam generator, is in proportion to the second gas substream $m_2$, which bypasses the steam generator, on the one hand the carbon activity decreases markedly, while at the same time the mixing temperature of the combined substreams substantially increases.

Initial reference is made to FIG. 1 below and by means of this a plant according to the invention for treating a synthesis gas stream is elucidated in more detail by way of example.

This plant comprises a steam reformer 1 in which, by way of example, a desulfurized natural gas as process gas is introduced via line 101. Steam reforming takes place in steam reformer 1 according to the reaction equation (1) reproduced above. The process gas partially reformed in steam reformer 1 exits the same via line 102 and is fed to a secondary reformer 2 in which the process gas is further reformed in accordance with the reaction equation (2) reproduced above. The crude synthesis gas 103 downstream of the secondary reformer 2 is now split into two substreams, namely a first substream 113 (referred to above as $m_1$), which is fed to a steam generator 13, and a second substream 123 (referred to above as $m_2$), which is branched off and, via a branching line bypassing the steam generator 13, is later recombined with the first substream.

The first substream 113 flows through the steam generator 13 which is fed boiler feed water via a line 210. The saturated steam generated in the steam generator 13 is fed via the line 211 to a steam superheater 14. The substream of the crude synthesis gas which has flowed through the steam generator 13 reaches a first CO conversion reactor 16 via the line 117, which again exits the same via the line 118 in order to be recombined downstream of the conversion reactor 16 with the second substream 123, which has bypassed the steam generator 13. A total gas stream of a partially converted crude synthesis gas is thus formed once again from the two substreams, which is then fed via the line 114 to the steam superheater 14. Therein, saturated steam fed via the line 211 is heated to give superheated steam which is discharged via the line 212, while the crude synthesis gas stream further cooled in the steam superheater 14 is fed via the line 115 to a further CO conversion reactor. In said conversion reactor, the further CO conversion takes place and the fully converted crude synthesis gas is then discharged therefrom via the line 116.

In this concept, the process gas downstream of the secondary reformer 2 is thus split into a first substream 113 and a second substream 123. The first substream 113 is cooled in the steam generator 13 to the inlet temperature of a conventional CO conversion 16, subsequently (partially) converted and then recombined with the untreated second substream 123. The combined process gas stream has both a significantly lower carbon monoxide content compared with the process gas stream in a plant with a conventional process regime and—by appropriate selection of the splitting ratio—a higher temperature.

The combination of the two effects ensures the significantly lower carbon activity mentioned above compared with the process gas in a conventional process regime. The reduced carbon activity compensates the acceleration of the reaction required for progression of a metal dusting attack and transport processes by means of the higher temperature. An advantageous secondary effect of the process regime according to the invention consists in that the heat formed in the CO conversion by the exothermic character of the reaction is raised to an extent to a higher temperature level by mixing with the warmer second substream 123 and is accordingly increased in value.

LIST OF REFERENCE NUMERALS

1 Steam Reformer
2 Secondary reformer
3 Steam generator

4 Steam superheater
5 CO conversion reactor
13 Steam generator in substream 1
14 Steam superheater
15 Second CO conversion reactor
16 First CO conversion reactor
101 Desulfurized natural gas
102 Pre-reformed process gas downstream of the primary reformer
103 Crude synthesis gas downstream of the secondary reformer
104 Cooled crude synthesis gas downstream of the steam generator
105 Cooled crude synthesis gas downstream of the steam superheater
106 Fully converted crude synthesis gas
113 Substream 1 of the crude synthesis gas downstream of the secondary reformer
114 Partially converted crude synthesis gas
115 Cooled crude synthesis gas downstream of the steam superheater
116 Fully converted crude synthesis gas
117 Substream 1 of the crude synthesis gas downstream of the steam generator
118 Substream 1 of the crude synthesis gas downstream of the CO conversion
200 Boiler feed water
201 Saturated steam
202 Superheated steam
210 Boiler feed water
211 Saturated steam
212 Superheated steam

What is claimed is:

1. A process for treating a synthesis gas stream comprising steam reforming firstly in a primary reformer and subsequently in a secondary reformer, the process comprising:
   splitting a crude synthesis gas stream that exits the secondary reformer into a first gas substream and a second gas substream;
   feeding the first gas substream to a steam generator;
   cooling the first gas substream in the steam generator;
   supplying the second gas substream to a steam superheater so as to bypass the steam generator;
   cooling the second gas substream in the steam superheater;
   subjecting only the first gas substream to a CO conversion reaction in a first CO conversion reactor after the first gas substream passes through the steam generator; and
   supplying the first gas substream to the steam superheater after the first gas substream passes through the first CO conversion reactor.

2. The process of claim 1 comprising:
   recombining the first and second gas substreams after the first gas substream exits the first CO conversion reactor; and
   supplying a partially-converted crude synthesis gas stream, which is formed by recombining the first gas substream and the second gas substream, to the steam superheater.

3. The process of claim 1 comprising feeding a cooled crude synthesis gas stream that exits the steam superheater to a second CO conversion reactor.

4. The process of claim 3 comprising discharging a fully-converted synthesis gas stream from the second CO conversion reactor.

5. The process of claim 1 comprising generating saturated steam in the steam generator and feeding the saturated steam to the steam superheater.

6. The process of claim 1 comprising discharging superheated steam from the steam superheater.

7. The process of claim 1 wherein the crude synthesis gas stream is split such that a ratio $m_1:m_2$ of the first gas substream to the second gas substream is 0.9 or less.

8. The process of claim 1 wherein the crude synthesis gas stream is split such that a ratio $m_1:m_2$ of the first gas substream to the second gas substream is 0.7 or less.

9. The process of claim 1 wherein the crude synthesis gas stream is split into the first and second gas substreams such that a mixing temperature of a stream formed by recombining the first and second gas substreams is at least 440° C.

10. The process of claim 1 wherein the crude synthesis gas stream is split into the first and second gas substreams such that a mixing temperature of a stream formed by recombining the first and second gas substreams is at least 550° C.

11. A plant for treating a synthesis gas stream, the plant comprising:
    a primary reformer;
    a secondary reformer downstream of the primary reformer, wherein a crude synthesis gas stream is configured to exit the secondary reformer;
    a steam generator downstream of the secondary reformer, wherein a first gas substream of the crude synthesis gas stream is configured to flow through the steam generator;
    a steam superheater downstream of the steam generator;
    a branch line that branches off downstream of the secondary reformer and is configured to convey a second gas sub stream, wherein the branch line is configured to divert the second gas substream from a region downstream of the secondary reformer and upstream of the steam generator so as to bypass the steam generator; and
    a first CO conversion reactor disposed downstream of the steam generator and upstream of the steam superheater, wherein only the first gas substream is configured to flow through the first CO conversion reactor.

12. The plant of claim 11 comprising a second CO conversion reactor disposed downstream of the steam superheater, wherein a combined crude synthesis stream comprised of the first and second gas sub streams is configured to flow through the second CO conversion reactor.

13. The plant of claim 11 configured to perform the process of claim 12.

* * * * *